G. W. CURRY.
PIPE COUPLING.
APPLICATION FILED JULY 17, 1908.

938,984.

Patented Nov. 2, 1909.

WITNESSES:
C. E. Brickland
Josephine M. Strempfer.

INVENTOR:
George W. Curry, by
Harry P. Williams
atty.

UNITED STATES PATENT OFFICE.

GEORGE W. CURRY, OF BROOKLYN, NEW YORK, ASSIGNOR TO GOOD MANUFACTURING COMPANY, OF NEW YORK, N. Y., A CORPORATION OF INDIANA.

PIPE-COUPLING.

938,984.            Specification of Letters Patent.      Patented Nov. 2, 1909.

Application filed July 17, 1908. Serial No. 443,965.

*To all whom it may concern:*

Be it known that I, GEORGE W. CURRY, a citizen of the United States, residing at Brooklyn, in the county of Kings and State of New York, have invented a new and useful Pipe-Coupling, of which the following is a specification.

This invention relates to a coupling which is adjustable so that it may be used for connecting the ends of pipes which are different distances apart, and which is flexible so that it will easily couple pipes, the ends of which are out of line, and it is particularly adapted for connecting supply pipes with the threaded tails of faucets, cocks and similar lavatory fittings.

The object of the invention is to produce a very simple metal pipe coupling which, while adjustable and flexible, is so constructed that it can easily be made tight and cannot pull apart or become loosened under any strain to which it may be subjected.

Figure 1:
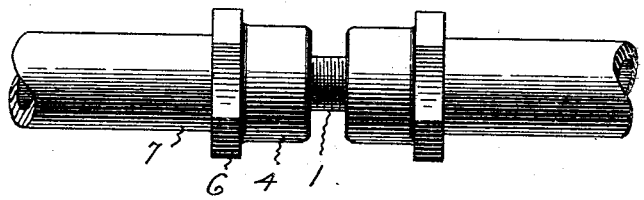
Figure 2:
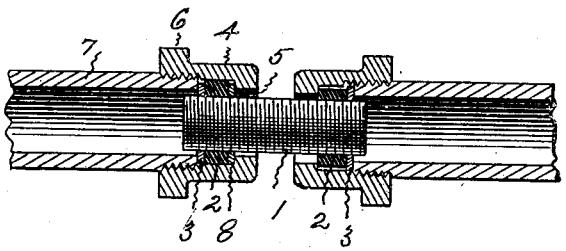

Figure 1 of the accompanying drawings shows a side view of a coupling that embodies the invention, joining the ends of two pipes. Fig. 2 shows a central longitudinal section of the same; and Fig. 3 shows an angle coupling which embodies the invention, with one coupling nut cut in central section.

Figure 3:
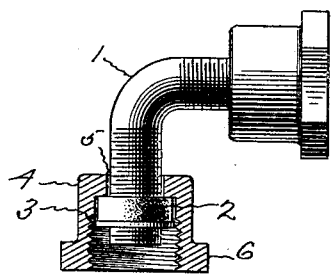

The coupling nipple 1 which may be straight as shown in Fig. 2, or bent as shown in Fig. 3, may be threaded its entire length as shown in Fig. 2, or only a part of its length as shown in Fig. 3. On this nipple near each end is a packing washer 2 which is preferably formed of rubber, although it may be formed of other compressible material. Back of each packing washer is a wearing washer 3 of brass, lead or other suitable material. These washers are threaded on the interior and screwed upon the nipple. Each end of the nipple with its packing washer and wearing washer extends into a coupling nut 4 which has an opening 5 in its front end which is slightly larger in diameter than the exterior diameter of the nipple, and which is preferably provided on the outside with an angular section 6 suitable for the application of a wrench. The interior of each coupling nut is threaded so that it may be screwed upon a pipe 7. The parts of the coupling may be put together with the packing washer bearing directly against the flanged end of the coupling nut as shown on the right in Fig. 2, or a wearing washer 8 of brass, lead, or any other suitable material, may be placed between the packing washer and the flanged end of the coupling nut as shown on the left in Fig. 2.

When the coupling is used for joining the ends of pipes, such for instance as a supply pipe and the tail of a faucet, one nut is screwed upon the supply pipe, preferably until the end of that pipe bears against the wearing washer, and compresses the packing so as to close the joint and provide against the leakage of water through the nut. The other coupling nut is then screwed upon the tail of the faucet in like manner, until the end of the tail bearing against the washer on the nipple compresses the packing so as to close the joint through that nut. These coupling nuts may be readily screwed upon the ends of two pipes or on the ends of a pipe and a faucet, cock or other part which are slightly out of line, or which are at a slight angle with relation to each other, for the openings through the nuts are usually, although not necessarily a little larger in diameter than the exterior diameter of the nipple, which allows the nipple to extend angularly and thus provide the necessary flexibility for the coupling. When the nuts are screwed firmly up the ends of the pipes or other parts compress the packings so they practically fill the interior of the nuts as shown on the left of Fig. 2, but they need not of necessity completely fill the interior of the nuts, as shown on the right of Fig. 2, and so seal the joints as to prevent the leakage of water. Fig. 2 shows a complete operative organization. If the packings are not compressed sufficiently tight to pack the joints when the nuts are screwed up, the washers that are threaded on the ends of the nipple may be screwed farther on to the nipple so as to lessen the distance between them. The nipples can be made at any length, and as stated, can be straight or bent, so that the packings may be adjusted according to the distance between the ends of the pipes or other parts.

When the parts are all in place with the washers back of the packings screwed upon the nipple, the coupling cannot be pulled apart for any strain tending to separate the ends of the pipes only tends to cause the washers which are larger than the openings through the ends of the nuts to more tightly compress the packings in the nuts.

The coupling could be used if the nipple were formed integral with the faucet or integral with one end of the pipe, in which case of course only one coupling nut would be employed.

The invention claimed is:

A coupling having a nipple that is threaded at both ends, nuts having flanges, with openings that are larger in diameter than the exterior diameter of the nipple, loose thereon, said nuts being interiorly threaded for the reception of the threaded ends of pipes, compressible packings on the nipple inside of the nuts, and washers with interior threads screwed upon the nipples in the nuts, nearer the ends of the nipples than the packings, whereby the distance between the nuts may be varied by adjusting the washers on the nipple and the packing be compressed between the flanges of the nuts and the washers when the nuts are screwed upon the ends of said pipes.

GEO. W. CURRY.

Witnesses:
WILLIAM JEFFREY,
FRANK McBRIDE.